US006331605B1

(12) United States Patent
Lunginsland et al.

(10) Patent No.: US 6,331,605 B1
(45) Date of Patent: Dec. 18, 2001

(54) OLIGOMERIC ORGANOSILANEPOLYSUFANES, THEIR USE IN RUBBER MIXTURES AND FOR PREPARING MOLDED ARTICLES

(75) Inventors: Hans-Detlef Lunginsland, Köln; Christoph Batz-Sohn, Hanau, both of (DE)

(73) Assignee: Degussa Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/329,370

(22) Filed: Jun. 10, 1999

(30) Foreign Application Priority Data

Jun. 10, 1998 (DE) ............................................ 198 25 796

(51) Int. Cl.$^7$ .................................................. C08G 77/22
(52) U.S. Cl. ......................... 528/30; 523/213; 524/492; 556/427; 556/431; 556/435; 568/21
(58) Field of Search ..................... 556/431, 435, 556/427; 568/21; 523/213; 528/30; 524/492

(56) References Cited

U.S. PATENT DOCUMENTS

| | | | |
|---|---|---|---|
| 3,842,111 | * | 10/1974 | Myer-Simon . |
| 3,873,489 | * | 3/1975 | Thurn et al. . |
| 4,044,037 | * | 8/1977 | Mui et al. . |
| 4,681,961 | * | 7/1987 | Zerpner et al. . |
| 5,650,457 | | 7/1997 | Scholl et al. ............... 524/262 |

FOREIGN PATENT DOCUMENTS

| | | |
|---|---|---|
| 1 210 192 | 8/1966 | (DE) . |
| 32 26 091 A1 | 1/1984 | (DE) . |
| 299 187 B5 | 4/1992 | (DE) . |
| 0 732 362 A1 | 9/1996 | (EP) . |
| 0 785 206 A1 | 7/1997 | (EP) . |

OTHER PUBLICATIONS

Bonsignore et al., "Polyalkylene Disulfides and Polysulfides Containing Silicon", J. Org. Chem., (Feb. 1960) vol. 25, pp. 237–240.
Nasiak et al., "Studies in Organosilicon Chemistry, XXXVI, Polymers Containing Sulfur", J. Org. Chem., (Apr. 1959) vol. 24, pp. 492–496.

\* cited by examiner

Primary Examiner—Robert Dawson
Assistant Examiner—Marc S. Zimmer
(74) Attorney, Agent, or Firm—Pillsbury Winthrop LLP

(57) ABSTRACT

Oligomeric organosilanepolysulfanes which are built up from the three structural units A and/or B and/or C,

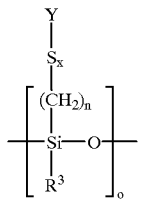

A

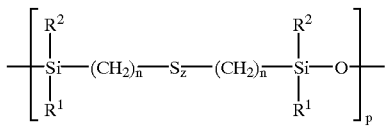

B

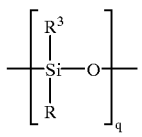

C in which Y=H, CN, —(CH$_2$)$_n$SiRR$^1$R$^2$;

n=1–8,

R, R$^1$, R$^2$ and R$^3$, independently, represent H, (C$_1$–C$_4$) alkyl, (C$_1$–C$_4$)alkoxy, halogen or a OSiR$^1$R$^2$R$^3$ group;

x, as a statistical average, is 1–6, z, as a statistical average, is 2–6, n is 1–8 and o, p and q are each a whole, positive number between 1 and 40 where o+p+q may be $\geq 2$ and <40, with the proviso that at least one structural unit A or B is present, and their use in rubber mixtures and to produce molded items, in particular pneumatic tires.

19 Claims, No Drawings

OLIGOMERIC ORGANOSILANEPOLYSUFANES, THEIR USE IN RUBBER MIXTURES AND FOR PREPARING MOLDED ARTICLES

CROSS-REFERENCE TO RELATED APPLICATION

This application is based on German Application DE 198 25 796.1, filed Jun. 10, 1998, which disclosure is incorporated herein by reference.

FIELD OF THE INVENTION

The present invention relates to new oligomeric organosilanepolysufanes, a process for preparing these and their use in rubber mixtures and for preparing molded articles.

BACKGROUND OF THE INVENTION

It is known that sulfur-containing organosilicon compounds such as 3-mercaptopropyltrimethoxysilane or bis-(3-[triethoxysilyl]-propyl)tetrasulfane can be used as silane bonding agents or reinforcing agents in oxide-filled rubber mixtures, inter alia for the treads and other parts of car tires (DE 2 141 159, DE 2 212 239, U.S. Pat. No. 3,978,103, U.S. Pat. No. 4,048,206).

EP 0 784 072 A1 discloses rubber mixtures based on at least one elastomer with silica as filler and a reinforcing additive, which is prepared by admixing or by producing 'in situ' as a reaction product from at least one functional polyorganosiloxane compound, and which contain a functional organosilane as a further constituent. Monomeric building blocks which are used are in particular 3-mercaptopropyltrialkoxysilanes or bis-(trialkoxysilylpropyl)tetrasulfanes, each of which contain 3 or 6 alkoxy substituents respectively.

Furthermore, it is known that sulfur-containing silane bonding agents, are used during the preparation of scaling compounds, casting molds for casting metal, colorant and protective paints, adhesives, asphalt mixtures and oxide-filled plastics materials.

Finally, possible applications include the fixing of active substances and functional units on inorganic support materials, e.g. when immobilizing homogeneous catalysts and enzymes, when preparing fixed bed catalysts and for liquid chromatography.

When preparing a rubber mixture with organosilanes and a filler, for example a precipitated silica, a chemical reaction takes place during a first mixing process, for example in an internal mixer. This chemical reaction consists of a condensation reaction between the organosilane and the filler, which is associated with the release of considerable amounts of an alcohol. This eliminated alcohol sometimes causes considerable technical problems during further processing of the rubber mixture, such as porosity of the mixture during extrusion or the undesired production of bubbles in the rubber itself. Furthermore, a reduction in the amount of alcohol released during reaction is desirable for health and environmental reasons.

SUMMARY OF THE INVENTION

It has now been found that these disadvantages in the prior art can be largely avoided by the use of oligomeric organosilanepolysufanes instead of the monomeric sulfur-containing compounds used hitherto.

Accordingly, the present invention provides new oligomeric organosilanepolysufanes in which the oligomeric organosilanepolysufane is built up from the three structural units A and/or B and/or C,

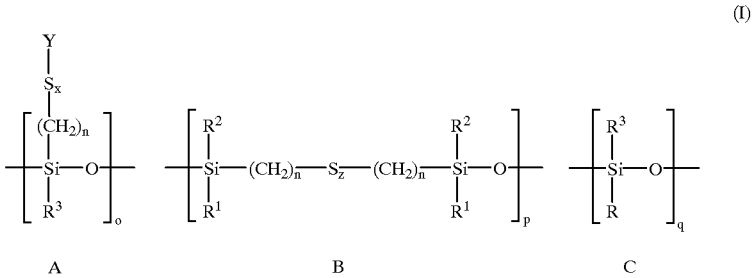

(I)

in which Y=H, CN, —(CH$_2$)$_n$SiRR$^1$R$^2$;

R, R$^1$, R$^2$ and R$^3$, independently, represent H, (C$_1$–C$_4$) alkyl, (C$_1$–C$_4$)alkoxy, halogen or a OSiR$^1$R$^2$R$^3$ group;

x, as a statistical average, is 1–6, z, as a statistical average, is 2–6, and n is 1–8 and o, p and q are each a whole, positive number from 1 to 40 where o+p+q may be ≧2 and <40, with the proviso that at least one structural unit A or B is present in the oligomeric organosilanepolysufane.

Preferred oligomeric organosilanepolysufanes of the type described above are built up from the 3 structural units A and/or B and/or C

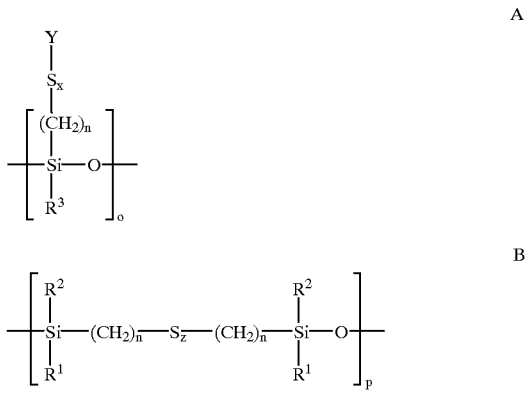

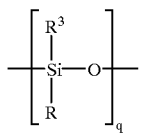

in which Y, R, $R^1$, $R^2$, $R^3$, x, z and n are defined in the same way as given above and o, p and q are each a whole, positive number between 1 and 20 where o+p+q may be $\geq 2$ and <20, with the proviso that at least one structural unit A or B is present.

The oligomeric organosilanepolysulfanes according to the invention may be designed to be cyclic, branched or linear via Y.

Compounds according to the invention may be either individual compounds with a defined molecular weight or an oligomeric mixture with a range of molecular weights. For process engineering reasons, oligomeric mixtures are generally simpler to prepare and accept. The compounds have molecular weights between about 800 and 16000 g/mol. Oligomeric organosilanepolysulfanes according to the invention preferably have molecular weights between about 800 and 5000 g/mol.

Oligomeric organosilanepolysulfanes according to the invention are built up in particular from the structural units B and C which are obtained by copolymerization of a suitable polysulfane and an organosilane.

Oligomeric organosilanepolysulfanes according to the invention are prepared by condensation of any two alkoxysilyl structural units. Within the scope of the substitution pattern mentioned above, any sulfur-containing organosilicon compound may be oligomerized with itself or copolymerized with another sulfur-containing or non-sulfur-containing organosilicon compound. In order to prepare oligomeric organosilanepolysulfanes according to the invention, a monomeric compound of the structural type I

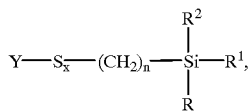 (I)

in which Y=H, CN, —$(CH_2)_n SiRR^1 R^2$;

R, $R^1$ and $R^2$, independently, represent H, ($C_1$–$C_4$)alkyl, ($C_1$–$C_4$)alkoxy, halogen or a $OSiR^1 R^2 R^3$ group and x, as a statistical average, may be 1 to 6, optionally in a solvent and/or optionally with the aid of a catalyst, is polymerized with itself at a reaction temperature between 0° C. and 150° C. and with the addition of water or is copolymerized under similar reaction conditions with a compound of the structural type II $RR^1 R^2 R^3 Si$ (II)

in which R, $R^1$, $R^2$ and $R^3$, independently, represent H, ($C_1$–$C_4$)alkyl, ($C_1$–$C_4$)alkoxy, halogen or a $OSiR^1 R^2 R^3$ group.

The list given below mentions examples of some (sulfur-containing) organosilicon compounds which are suitable for the reaction according to the invention:

bis-(3-[triethoxysilyl]-propyl)tetrasulfane,
3-thiocyanatopropyltriethoxysilane,
3-mercaptopropyltrimethoxysilane,
propyltriethoxysilane, octyltriethoxysilane, hexadecyltriethoxysilane,
dimethyldiethoxysilane,
3-mercaptopropyltriethoxysilane,
bis-3-triethoxysilylpropyldisulfane,
bis-3-triethoxysilylpropyltrisulfane.

The condensation reaction takes place by adding water with the elimination of alcohol and may be performed in bulk or in an inert organic solvent or mixtures thereof such as, for example, in an aromatic solvent such as chlorobenzene, a halogenated hydrocarbon such as chloroform or methylene chloride, an ether such as diisopropyl ether, tert.-butyl methyl ether, tetrahydrofuran or diethyl ether, acetonitrile or a carboxylate, for example ethyl acetate, methyl acetate or isopropyl acetate or an alcohol, for example methanol, ethanol, n-propanol, i-propanol, n-butanol, sec.-butanol or tert.-butanol. Preferred solvents are ethanol or ethyl acetate. The reaction may be catalyzed. The catalyst may then be added in catalytic or stoichiometric amounts. Any type of acidic, basic or nucleophilic catalysts, which are known to a person skilled in the art of the SOLGEL chemistry of alkoxysilanes (see e.g. R. Corriu, D. Leclercq, Angew. Chem. 1996, 108, 1524–1540) are also suitable for oligomerization reactions in the context of the invention. It makes no difference here whether the catalysts are present in the same phase as the reaction solution (homogeneous catalysis) or are present as solids (heterogeneous catalysis) and isolated after completion of the reaction.

Homogeneous catalysis with a Lewis acid such as, for example, tetrabutyl orthotitanate or nucleophilic catalysis with ammonium fluoride or heterogeneous catalysis with aluminum oxide are particularly suitable. Basic catalysis takes place, for example, with an organic base such as triethylamine, tetramethylpiperidine, tributylarnine or pyridine or with an inorganic base such as NaOH, KOH, $Ca(OH)_2$, $Na_2 CO_3$, $K_2 CO_3$, $CaCO_3$, CaO, $NaHCO_3$, $KHCO_3$ or alcoholates such as $NaOCH_3$ or $NaOC_2 H_5$. Nucleophilic catalysis may take place using any fluoride, for example ammonium fluoride, sodium fluoride, potassium fluoride or any tetraalkylammonium fluorides such as tetrabutylammonium fluoride. Acid catalysis may be performed with dilute aqueous mineral acids or solutions of Lewis acids in water. Catalysis with dilute aqueous NaOH or a solution of ammonium fluoride in water is preferred, wherein 1 mol-% of catalyst to the amount of water added is used. The reaction conditions, in particular the amount of water to be added, are selected so that the reaction products do not polycondense to give a solid. After completion of reaction, the very volatile constituents are removed in a manner known to a person skilled in the art and the catalyst is deactivated or removed in a conventional manner.

The expression "alkyl" is understood to cover both "straight chain" and "branched" alkyl groups. "Straight chain alkyl groups" are understood to be groups such as, for example, methyl, ethyl, n-propyl, n-butyl, n-pentyl and n-hexyl, "branched alkyl groups" are understood to be groups such as, for example, isopropyl or tert.-butyl. The expression halogen is understood to mean fluorine, chlorine, bromine or iodine. The expression "alkoxy group" is understood to cover groups such as, for example, methoxy, ethoxy, propoxy, butoxy, isopropoxy, isobutoxy or pentoxy.

In the case of data relating to substituents, such as e.g. ($C_1$–$C_4$)alkoxy, the number in the subscript gives all the carbon atoms in the group.

In Examples 1 to 4, the preparation of oligomeric organosilanepolysulfanes according to the invention is described by way of example.

The invention also provides rubber mixtures which contain the new oligomeric organosilanepolysulfanes as bonding agents or reinforcing additives and molded articles which result after a vulcanization step, in particular pneumatic tires or tire treads which, after performing the process according to the invention, have a low rolling resistance and at the same time have good wet road grip and a high resistance to abrasion.

The present invention therefore provides rubber mixtures which contain rubber, fillers, in particular precipitated silica, and optionally other rubber auxiliary substances, and at least one oligomeric organosilanepolysulfane which is built up from the structural units described above and which is used in amounts of 0.1 to 15 wt. % with respect to the amount of rubber used.

The unacceptable release of alcohol in rubber mixtures is greatly reduced by using the oligomeric organosilanepolysulfanes according to the invention, due to the precondensation reaction which has already taken place. Compared with the conventional mode of operation, for example by simply using bis-(3-[triethoxysilyl]-propyl)tetrasulfane (TESPT) as the bonding agent, the evolution of alcohol is reduced by about 30% (see Examples 1 to 4).

Surprisingly, it has now been found, furthermore, that rubber mixtures prepared with oligomeric silanes and the vulcanizates prepared therefrom have advantages over mixtures which are prepared in the conventional manner with monomeric silanes. This is shown in particular by an improved set of characteristics with regard to the static and dynamic properties of the vulcanizates produced. This results in improved tensile strength, a reduced ball-rebound (at 0° C.) and increased tan $\delta$ (at 0° C.) values (see also Tables 3 to 5). This leads to improved wet-grip behavior for the tire. Surprisingly, this improvement is achieved without having to accept losses in the area of rolling resistance (correlates with tan $\delta$ at 60° C.).

Particularly preferred oligomers for use in rubber mixtures are those which contain 50 to 85% of structural units A and B where Y=$(CH_2)_n$SiRR$^1$R$^2$, n=3 and R, R$^1$ and R$^2$=OC$_2$H$_5$ (determined via the residual content of OC$_2$H$_5$ using $^1$H-NMR spectroscopy) and in which x and z, as a statistical average, are 2 to 4.

Adding the oligomeric organosilanepolysulfanes according to the invention and adding the filler preferably takes place at a material temperature of 100° to 200° C., but it may also take place later at lower temperatures (40° to 100° C.), e.g. together with other rubber auxiliary substances.

The oligomeric organosilanepolysulfanes may be added in the mixing process either in the pure form or adsorbed on an inert organic or inorganic support. Preferred support materials are silica, natural or synthetic silicates, aluminium oxides or carbon black.

The following fillers are suitable for use in rubber mixtures according to the invention:

Carbon black: The carbon blacks used here are prepared by the lamp black, furnace black or channel black method and have BET surface areas of 20 to 200 m$^2$/g, such as e.g. SAF, ISAF, HSAF, HAF, FEF or GPF carbon black. Optionally, the carbon blacks may also contain heteroatoms such as e.g. Si.

Highly disperse silicas, prepared e.g. by precipitation from solutions of silicates or by flame hydrolysis of silicon halides with specific surface areas of 5 to 1000, preferably 20 to 400 m$^2$/g (BET surface area) and with primary particle sizes of 10 to 400 nm. Optionally, the silicas may also be present as mixed oxides with other metal oxides such as Al, Mg, Ca, Ba, Zn, and titanium oxides.

Synthetic silicates such as aluminium silicate, alkaline earth silicates such as magnesium silicate or calcium silicate, with BET surface areas of 20 to 400 m$^2$/g and primary particle diameters of 10 to 400 nm.

Natural silicates such as kaolin and other naturally occurring silicates.

Glass fibers and glass fiber products (mats, ropes) or glass microbeads.

Carbon blacks with BET surface areas of 20 to 400 m$^2$/g or highly disperse silicas, prepared by precipitation from solutions of silicates, with BET surface areas of 20 to 400 m$^2$/g, in amounts of 5 to 150 parts by wt., each with respect to 100 parts of rubber, are preferably used.

The fillers mentioned may be used individually or as mixtures. In a particularly preferred embodiment of the process, 10 to 150 parts by wt. of pale-coloured filler, optionally together with 0 to 100 parts by wt. of carbon black, and 0.3 to 10 parts by wt. of a compound of the formula (I), each with respect to 100 parts by wt. of rubber, are used to prepare the mixtures.

In addition to natural rubber, synthetic rubbers are also suitable for preparing rubber mixtures according to the invention. Preferred synthetic rubbers are, for example, those described in W. Hofmann, Kautschuktechnologie, Genter Verlag, Stuttgart, 1980. These include, inter alia, polybutadiene (BR)

polyisoprene (IR)

stirene/butadiene copolymers with stirene contents of 1 to 60, preferably 2 to 50 wt. % (SBR)

isobutylene/isoprene copolymers (IIR)

butadiene/acrylonitrile copolymers with acrylonitrile contents of 5 to 60, preferably 10 to 50 wt. % (NBR)

partly hydrogenated or fully hydrogenated NBR rubber (HNBR)

ethylene/propylene/diene copolymers (EPDM)

and mixtures of these rubbers. Anionically polymerized S-SBR rubbers with a glass transition temperature above −50° C. and their mixtures with diene rubbers are of particular interest for preparing vehicle tires.

Rubber vulcanizates according to the invention may contain other rubber auxiliary substances such as reaction accelerators, anti-aging agents, thermal stabilizers, light stabilizers, anti-ozone agents, processing aids, plasticizers, tackifiers, blowing agents, colorants, pigments, waxes, extenders, organic acids, retarding agents, metal oxides and activators such as triethanolamine, polyethylene glycol, hexanetriol, which are known in the rubber industry.

The rubber auxiliary substances are used in conventional amounts which are governed, inter alia, by the ultimate use. Conventional amounts are, for example, amounts of 0.1 to 50 wt. % with respect to the rubber. The oligomeric silanes may be used as the only cross-linking agent. The addition of further cross-linking agents is generally recommended. Sulfur or peroxides may be used as further known cross-linking agents. Rubber mixtures according to the invention may also contain vulcanization accelerators. Examples of suitable vulcanization accelerators are mercaptobenzthiazoles, sulfenamides, guanidine, thiurams, dithiocarbamates, thiourea and thiocarbonates. The vulcanization accelerator and sulfur or peroxide are used in amounts of 0.1 to 10 wt. %, preferably 0.1 to 5 wt. %, with respect to the rubber Vulcanization of rubber mixtures according to the invention may take place at temperatures of 100° to 200° C., preferably 130° to 180° C., optionally under a pressure of 10 to 200 bar. Admixture to the rubber of the fillers, optional rubber auxiliary substances and oligomeric silanes (I)

according to the invention may be performed in conventional mixing units such as rollers, internal mixers and mixer extruders. Rubber vulcanizates according to the invention are suitable for the production of molded articles, for example the production of pneumatic tires, treads for tires, cable sheathing, hoses, drive belts, conveyer belts, roller coatings, tires, soles of shoes, sealing rings and damping elements.

DETAILED DESCRIPTION OF THE PREFERRED EMBODIMENT

EXAMPLES 1–4

Preparation of Oligomeric Organosilane-polysulfanes

Example 1

266 g (0.50 mol) of bis-(3[triethoxysilyl]-propyl) tetrasulfane (TESPT, Degussa AG) are initially introduced, with 1 ml of tetrabutyl orthotitanate, into a 500 ml round-bottomed flask, with stirring at 80° C. Then 6.75 g (0.38 mol) of $H_2O$, taken up in 10 ml of ethanol AR, are added slowly with stirring. After completion of the addition process, stirring is continued for 1 hour at 80° C., then the ethanol is distilled off at 80° C. and 500–300 mbar. Then the remaining volatile components are removed at 80° C./30 mbar. An oily, yellow product with 2.38 ethoxy groups per Si unit (from $^1HNMR$) and a 25.0% residue on ignition is obtained.

Example 2

133 g (0.25 mol) of TESPT are introduced, with 1 ml of tetrabutyl orthotitanate and 100 ml of ethanol AR, into a 500 ml round-bottomed flask, with stirring at 80° C. Then 5.40 g (0.30 mol) of $H_2O$, taken up in 10 ml of ethanol AR, are added slowly with stirring. Further preparation is performed as described in Example 1. A highly viscous, yellow product with 2.08 ethoxy groups per Si unit (from $^1H$-NMR) and a 25.8% residue on ignition is obtained.

Example 3

Preparation was performed in the same way as in Example 1. 133 g (0.25 mol) of TESPT and 44.0 g (0.21 mol) of propyltriethoxysilane (PTES) were used as reactants. The amount of $H_2O$ added was 8.50 g (0.47 mol). An oily product with only 1.85 ethoxy groups per Si unit (from $^1H$-NMR) and a 28.8% residue on ignition is obtained.

Example 4

Preparation was performed in the same way as in Example 3, with the modification that here, instead of PTES, 31.0 g (0.21 mol) of dimethyldiethoxysilane (DMDES, Gelest) are used. The oily product obtained had 1.60 ethoxy groups per Si unit according to $^1H$-NMR. The residue on ignition was 30.3%.

Examples 5–11

Preparation of Rubber Mixtures and Vulcanizates
General Method Used

The rubber mixture is prepared in a two-stage process in an internal mixer (Werner & Pfleiderer GK1.5N) with a mixing time of 6 minutes and 5 minutes at a speed of rotation of 70 rpm with an output temperature of at most 155° C., followed by a mixing stage in an internal mixer at a temperature of at most 90° C., in accordance with the formulations given in Table 1 below. The unit 'phr' means the parts by weight with respect to 100 parts of the crude rubber used.

The general method for preparing rubber mixtures and their vulcanizates are described, for example, in "Rubber Technology Handbook", W. Hofmann, Hanser Verlag, 1994.

The vulcanizing time for the test specimens is 60 minutes at 165° C.

TABLE 1

| Substance | Amount [phr] |
| --- | --- |
| 1st stage | |
| Buna VSL 5025-1 | 96.0 |
| Buna CB 24 | 30.0 |
| Ultrasil VN3 | 80.0 |
| ZnO | 3.0 |
| Stearic acid | 2.0 |
| Naftolene ZD | 10.0 |
| Vulkanox 4020 | 1.5 |
| Protector G35P | 1.0 |
| TESPT | 6.4 |
| 2nd stage | |
| Batch stage 1 | |
| 3rd stage | |
| Batch stage 2 | |
| Vulkacit D | 2.0 |
| Vulkacit CZ | 1.5 |
| Sulfur | 1.5 |

The VSL 5025-1 polymer is a SBR copolymer polymerized in solution, from Bayer AG, with a styrene content of 25 wt. % and a butadiene content of 75 wt. %. 73% of the butadiene is 1,2-linked, 10% is cis-1,4-linked and 17% is trans-1,4-linked. The copolymer contains 37.5 phr of oil and has a Mooney viscosity (ML 1+4/100° C.) of about 50.

The Buna CB 24 polymer is a cis-1,4 polybutadiene (titanium type) from Bayer AG with a cis-1,4-content of 92%, a trans-1,4 content of 4%, a 1,2-linked content of 4% and a Mooney viscosity between 44 and 50.

The VN3 silica from Degussa AG has a BET surface area of 175 m$^2$/g.

TESPT (bis-3-[triethoxysilyl]-propyl)tetrasulfane) is marketed by Degussa AG under the tradename Si 69.

Naftolen ZD from Chemetall was used as an aromatic oil; Vulkanox 4020 is a PPD from Bayer AG and Protektor G35P is an anti-ozone wax from HB-Fuller GmbH. Vulkacit D (DPG) and Vulkacit CZ (CBS) are commercial products from Bayer AG.

Testing for rubber engineering properties was performed in accordance with the test methods given in table 2.

TABLE 2

| Physical Test | Standard/Conditions |
| --- | --- |
| ML 1 + 4, 100° C. | DIN 53523/3, ISO 667 |
| Vulcameter test, 165° C. | DIN 53529/3, ISO 6502 |
| Ring tensile test, 23° C. | DIN 53504, ISO 37 |
| Tensile strength | |
| Modulus | |
| Elongation at break | |
| Shore A hardness, 23° C. | DIN 53 505 |
| Ball rebound, 0 and 60° C. | ASTM D 5308 |
| Viscoelastic characteristics, 0 and 60° C. E* | DIN 53 513, ISO 2856 |

TABLE 2-continued

| Physical Test | Standard/Conditions |
|---|---|
| tan δ | |
| DIN abrasion, 10N force | DIN 53 516 |
| Dispersion | ISO/DIN 11345 |

Examples 5, 6 and 7

Examples 5 (comparative Example), 6 and 7 were performed in accordance with the general method described above.

Differently from Example 5, 6.1 phr of the oligomeric silanes from Example 1 and Example 2, instead of 6.4 phr of TESPT, was used in the mixture in Examples 6 and 7. The in-rubber engineering data for the green compound and for the vulcanizate are given below:

TABLE 3

| Example | | 5 | 6 | 7 |
|---|---|---|---|---|
| Feature: | unit: | TESPT | Oligomeric silane from Example 1 | oligomeric silane from Example 2 |
| Green compound results | | | | |
| ML(1 + 4) at 100° C. | [ME] | 66 | 68 | 67 |
| Dmax-Dmin | [dNm] | 17.1 | 17.35 | 16.97 |
| t 10% | [min] | 1.94 | 1.81 | 1.8 |
| t 90% | [min] | 30.11 | 34.57 | 31.89 |
| Vulcanizate results | | | | |
| Tensile strength | [MPa] | 14.0 | 11.5 | 14.2 |
| Modulus 100% | [MPa] | 2.4 | 2.5 | 2.5 |
| Modulus 300% | [MPa] | 11.2 | 11.5 | 11.5 |
| Elongation at break | [%] | 340 | 300 | 350 |
| Shore A hardness | [SH] | 65 | 66 | 65 |
| Ball rebound (0° C.) | [%] | 11.1 | 10.6 | 10.7 |
| Ball rebound (60° C.) | [%] | 62.1 | 64.0 | 63.1 |
| DIN abrasion | [mm$^3$] | 86 | 87 | 84 |
| Dyn. yield modulus E* (0° C.) | [MPa] | 23.2 | 21.8 | 23.6 |
| Dyn. yield modulus E* (60° C.) | [MPa] | 9.7 | 9.1 | 9.3 |
| Loss factor tan δ (0° C.) | [-] | 0.481 | 0.480 | 0.489 |
| Loss factor tan δ (60° C.) | [-] | 0.111 | 0.110 | 0.115 |

Example 8 (comparative example)

Differently from comparative Example 5, a mixture of 4.8 phr of TESPT and 1.6 phr of PTES was used instead of 6.4 phr of TESPT. The in-rubber data for this mixture and the corresponding vulcanizate are compared with the in-rubber values for Example 9 in Table 4.

Example 9

Differently from comparative Example 8, the oligomeric silane from Example 3 was used instead of the mixture of TESPT and PTES. The in-rubber data for the green compound and the vulcanizate are given below:

TABLE 4

| Example | | 8 | 9 |
|---|---|---|---|
| Feature: | Unit: | Mixture of TESPT and PTES | Oligomeric silane from Example 3 |
| Green compound results | | | |
| ML(1 + 4) at 100° C. | [ME] | 63 | 65 |
| Dmax-Dmin | [dNm] | 17.35 | 18.91 |
| t 10% | [min] | 2.09 | 1.92 |
| t 90% | [min] | 28.09 | 24.34 |
| Vulcanizate results | | | |
| Tensile strength | [MPa] | 14.9 | 14.1 |
| Modulus 100% | [MPa] | 2.5 | 2.7 |
| Modulus 300% | [MPa] | 11.2 | 12.5 |
| Elongation at break | [%] | 360 | 330 |
| Shore A hardness | [SH] | 66 | 66 |
| Ball rebound (0° C.) | [%] | 10.6 | 10.1 |
| Ball rebound (60° C.) | [%] | 62.8 | 63.2 |
| DIN abrasion | [mm$^3$] | 92 | 89 |
| Dyn. yield modulus E* (0° C.) | [MPa] | 23.6 | 25.5 |
| Dyn. yield modulus E* (60° C.) | [MPa] | 9.3 | 9.8 |
| Loss factor tan δ (0° C.) | [-] | 0.489 | 0.496 |
| Loss factor tan δ (60° C.) | [-] | 0.112 | 0.105 |

Example 10 (comparative example)

Differently from comparative Example 5, a mixture of 5.2 phr of TESPT and 1.2 phr of DMDES was used instead of 6.4 phr of TESPT. The in-rubber data for this mixture and the corresponding vulcanizate are compared with the in-rubber data for Example 11 in Table 5.

Example 11

Differently from comparative Example 10, 6.1 phi of the oligomeric silane from Example 4 was used instead of the mixture of TESPT and DMDES. The in-rubber data for the green compound and the vulcanizate are given below (Table 5):

TABLE 5

| Example | | 10 | 11 |
|---|---|---|---|
| Feature: | Unit: | Mixture of TESPT and DMDES | Oligomeric silane from Example 4 |
| Green compound results | | | |
| ML(1 + 4) at 100° C. | [ME] | 66 | 66 |
| Dmax-Dmin | [dNm] | 17.78 | 18.2 |
| t 10% | [min] | 2.12 | 1.86 |
| t 90% | [min] | 27.9 | 25.4 |
| Vulcanizate results | | | |
| Tensile strength | [MPa] | 11.5 | 15.6 |
| Modulus 100% | [MPa] | 2.4 | 2.6 |
| Modulus 300% | [MPa] | 11.0 | 11.7 |
| Elongation at break | [%] | 310 | 360 |
| Shore A hardness | [SH] | 66 | 66 |
| Ball rebound (0° C.) | [%] | 10.8 | 10.5 |
| Ball rebound (60° C.) | [%] | 61.5 | 63.0 |
| DIN abrasion | [mm$^3$] | 87 | 92 |
| Dyn. yield modulus E* (0° C.) | [MPa] | 25.5 | 24.4 |
| Dyn. yield modulus E* (60° C.) | [MPa] | 9.7 | 9.3 |
| Loss factor tan δ (0° C.) | [-] | 0.481 | 0.500 |
| Loss factor tan δ (60° C.) | [-] | 0.111 | 0.111 |

What is claimed is:

1. Oligomeric organosilanepolysulfanes containing structural unit A and at least one structural unit selected from the group consisting of structural units B and C linked in any linear, branched or cyclic arrangement,

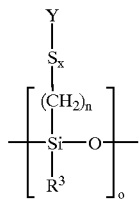

A

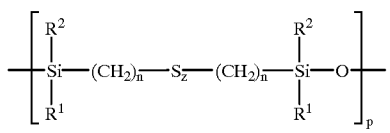

B

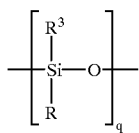

C wherein Y=H, CN, —$(CH_2)_n SiRR^1R^2$;
n=1–8,
R, $R^1$, $R^2$ and $R^3$, independently, represent H, $(C_1-C_4)$ alkyl, $(C_1-C_4)$alkoxy, halogen or a $OSiR^1R^2R^3$ group;
x, as a statistical average, is 1–6,
z, as a statistical average, is 2–6,
n is 1–8 and
o, p and q are each a whole, positive number between 1 and 40 where o+p+q may be $\geq 2$ and <40, with the proviso that at least one structural unit A or B is present.

2. Oligomeric organosilanepolysulfanes containing at least one structural unit selected from the group consisting of structural units A, B and C linked in any linear, branched or cyclic arrangement,

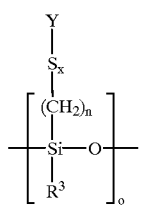

A

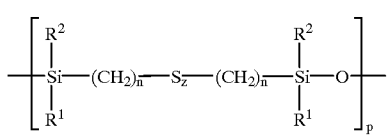

B

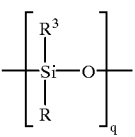

C wherein Y=H, CN, —$(CH_2)_n SiRR^1R^2$;
n=1–8,
R, $R^1$, $R^2$ and $R^3$, independently, represent H, $(C_1-C_4)$ alkyl, $(C_1-C_4)$alkoxy, halogen or a $OSiR^1R^2R^3$ group;
n is 1–8,
o, p and q are each a whole, positive number between 1 and 40 where o+p+q may be $\geq 2$ and <40, with the proviso that at least one structural unit A or B is present,
wherein the organosilanepolysulfane contains 50 to 85% of the two structural units A and B in which Y=—$(CH_2)_n SiRR^1R^2$, $R=R^1=R^2$=ethoxy, n=3, and
wherein x and z, as a statistical average, are 2–4.

3. Oligomeric organosilanepolysulfanes according to claim 1 or 2, comprising the structural units B and C.

4. Oligomeric organosilanepolysulfanes according to claim 1 or 2, comprising a mixture of organosilanepolysulfanes with different chain lengths.

5. A process for preparing oligomeric organosilanepolysulfanes according to claim 1 or 2, comprising:
polymerizing a compound of the structural type (I)

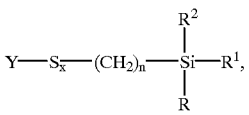

(I)

in which Y=H, CN, —$(CH_2)_n SiRR^1R^2$;
R, $R^1$ and $R^2$, independently, represent H, $(C_1-C_4)$ alkyl, $(C_1-C_4)$alkoxy, halogen or a $OSiR^1R^2R^3$ group and x, as a statistical average, may be 1 to 6, optionally in a solvent and/or optionally with the aid of a catalyst,
with itself at a reaction temperature between 0° C. and 150° C. and with the addition of water.

6. A process for preparing oligomeric organosilanepolysulfanes according to claim 1 or 2, comprising:
copolymerizing a compound of the structural type (I)

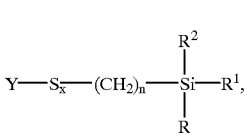

(I)

in which Y=H, CN, —$(CH_2)_n SiRR^1R^2$;
R, $R^1$ and $R^2$, independently, represent H, $(C_1-C_4)$ alkyl, $(C_1-C_4)$alkoxy, halogen or a $OSiR^1R^2R^3$ group and x, as a statistical average, may be 1 to 6, optionally in a solvent and/or optionally with the aid of a catalyst,
at a reaction temperature between 0° C. and 150° C. and with the addition of water, with a compound of the structural type II $$RR^1R^2R^3Si \quad (II)$$

in which R, R$^1$, R$^2$ and R$^3$, independently, represent H, (C$_1$–C$_4$)alkyl, (C$_1$–C$_4$)alkoxy, halogen or a OSiR$^1$R$^2$R$^3$ group.

7. A process for preparing oligomeric organosilanepolysulfanes containing at least one structural unit selected from the group consisting of structural units A, B and C linked in any linear, branched or cyclic arrangement,

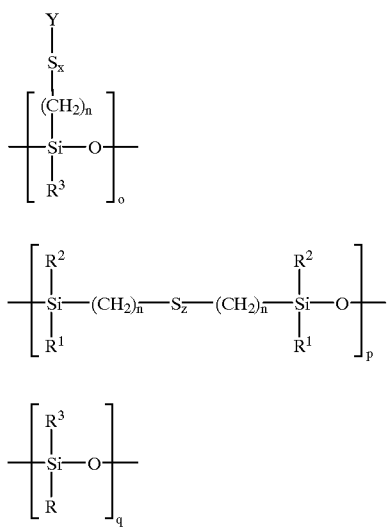

wherein Y=H, CN, —(CH$_2$)$_n$SiRR$^1$R$^2$;
n=1–8,
R, R$^1$, R$^2$ and R$^3$, independently, represent H, (C$_1$–C$_4$) alkyl, (C$_1$–C$_4$)alkoxy, halogen or a OSiR$^1$R$^2$R$^3$ group;
n is 1–8,
o, p and q are each a whole, positive number between 1 and 40 where o+p+q may be ≧2 and <40, with the proviso that at least one structural unit A or B is present,
wherein the organosilanepolysulfane contains 50 to 85% of the two structural units A and B in which Y=—(CH$_2$)$_n$SiRR$^1$R$^2$, R=R$^1$=R$^2$=ethoxy, n=3, wherein x and z, as a statistical average, are 2–4, comprising:
copolymerizing a compound of the structural type (I)

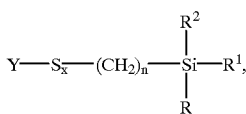

in which Y=H, CN, —(CH$_2$)$_n$SiRR$^1$R$^2$;
R, R$^1$ and R$^2$, independently, represent H, (C$_1$–C$_4$) alkyl, (C$_1$–C$_4$)alkoxy, halogen or a OSiR$^1$R$^2$R$^3$ group and x, as a statistical average, may be 1 to 6, optionally in a solvent and/or optionally with the aid of a catalyst,
at a reaction temperature between 0° C. and 150° C. and with the addition of water,
with a compound of the structural type II $$RR^1R^2R^3Si \quad (II)$$

in which R, R$^1$, R$^2$ and R$^3$, independently, represent H, (C$_1$–C$_4$)alkyl, (C$_1$–C$_4$)alkoxy, halogen or a OSiR$^1$R$^2$R$^3$ group,
wherein the compound of structural type (I) is bis(3-{triethoxysilyl}-propyl)tetrasulfane and the compound of structural type (II) is propyltriethoxysilane or dimethylethoxysilane.

8. Oligomeric organosilanepolysulfanes, obtained by a process according to claim 5.

9. Oligomeric organosilanepolysulfanes, obtained by a process according to claim 6.

10. A process for using oligomeric organosilanepolysulfanes according to claim 1 or 2 in rubber mixtures, comprising:
adding the oligomeric organosilanepolysulfane to a rubber mixture.

11. Rubber mixtures containing an oligomeric organosilanepolysulfane according to claim 1 or 2.

12. Rubber mixtures according to claim 11, comprising the organosilanepolysulfane in an amount of 0.1 to 15 wt. %, with respect to the amount of rubber.

13. Rubber mixtures comprising an oligomeric organosilanepolysulfane containing at least one structural unit selected from the group consisting of structural units A, B and C linked in any linear, branched or cyclic arrangement,

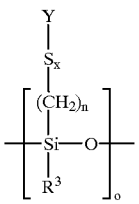

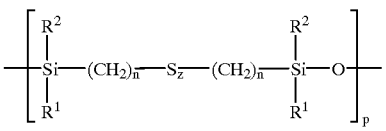

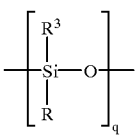

wherein Y=H, CN, —(CH$_2$)$_n$SiRR$^1$R$^2$;
n=1–8,
R, R$^1$, R$^2$ and R$^3$, independently, represent H, (C$_1$–C$_4$) alkyl, (C$_1$–C$_4$)alkoxy, halogen or a OSiR$^1$R$^2$R$^3$ group;
x, as a statistical average, is 1–6,
z, as a statistical average, is 2–6,
n is 1–8, and
o, p and q are each a whole, positive number between 1 and 40 where o+p+q may be ≧2 and <40, with the proviso that at least one structural unit A or B is present,
wherein the organosilanepolysulfane contains 50 to 85% of structural units A and B in which Y=—(CH$_2$)$_n$SiRR$^1$R$^2$, wherein R=R$^1$=R$^2$=ethoxy and n=3 and in which x and y, as a statistical average, are 2 to 4.

14. Rubber mixtures comprising an oligomeric organosilanepolysulfane containing at least one structural unit selected from the group consisting of structural units A, B and C linked in any linear, branched or cyclic arrangement,

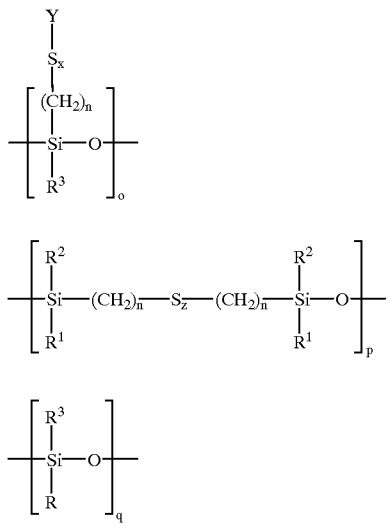

wherein Y=H, CN, —$(CH_2)_n SiRR^1R^1R^2$;
n=1–8,
R, $R^1$, $R^2$ and $R^3$, independently, represent H, $(C_1–C_4)$ alkyl, $(C_1–C_4)$alkoxy, halogen or a $OSiR^1R^2R^3$ group;
x, as a statistical average, is 1–6,
z, as a statistical average, is 2–6,
n is 1–8, and
o, p and q are each a whole, positive number between 1 and 40 where o+p+g may be $\geq 2$ and <40, with the proviso that at least one structural unit A or B is present,
the rubber mixtures comprising a synthetic rubber, a silica as filler and the oligomeric organosilanepolysulfane, which has been obtained by polymerization of bis-(3-[triethoxysilyl]-propyl)tetrasulfane or by copolymerization of bis-(3-[triethoxysilyl]-propyl)tetrasulfane and propyltriethoxysilane.

15. A process for preparing rubber mixtures which contain, in addition to the rubber, at least one further filler, comprising adding an oligomeric organosilanepolysulfane according to claim 1 to the rubber mixture.

16. A molded article, obtained from a rubber mixture according to claim 11.

17. A molded article according to claim 16, comprising a pneumatic tire.

18. A molded article according to claim 16, comprising a tire tread.

19. A process for using rubber mixtures according to claim 11, comprising:
molding the rubber mixtures to form pneumatic tires or tire treads.

* * * * *